(12) United States Patent
Breton et al.

(10) Patent No.: US 8,236,870 B2
(45) Date of Patent: *Aug. 7, 2012

(54) CURABLE SOLID INK COMPOSITIONS

(75) Inventors: Marcel P. Breton, Mississauga (CA); Michelle N. Chretien, Mississauga (CA); Jeffrey H. Banning, Hillsboro, OR (US); Stephan V. Drappel, Toronto (CA); Ian R. Duffy, Richmond (CA); Christopher A. Wagner, Etobicoke (CA)

(73) Assignee: Xerox Corporation, Norwalk, CT (US)

( * ) Notice: Subject to any disclaimer, the term of this patent is extended or adjusted under 35 U.S.C. 154(b) by 276 days.

This patent is subject to a terminal disclaimer.

(21) Appl. No.: 12/704,194

(22) Filed: Feb. 11, 2010

(65) Prior Publication Data

US 2011/0196057 A1 Aug. 11, 2011

(51) Int. Cl.
*C09D 11/02* (2006.01)
*C09D 11/10* (2006.01)

(52) U.S. Cl. ............. 522/8; 522/42; 522/50; 522/64; 522/75; 522/173

(58) Field of Classification Search ............. 522/8, 42, 522/50, 64, 75, 79, 80, 173
See application file for complete search history.

(56) References Cited

U.S. PATENT DOCUMENTS

| 4,167,503 | A | * | 9/1979 | Cipriani | 524/297 |
|---|---|---|---|---|---|
| 4,889,560 | A | | 12/1989 | Jaeger et al. | |
| 4,889,761 | A | | 12/1989 | Titterington et al. | |
| 5,221,335 | A | | 6/1993 | Williams et al. | |
| 5,372,852 | A | | 12/1994 | Titterington et al. | |
| 5,621,022 | A | | 4/1997 | Jaeger et al. | |
| 5,750,604 | A | * | 5/1998 | Banning et al. | 524/187 |
| 5,782,966 | A | * | 7/1998 | Bui et al. | 106/31.43 |
| 6,028,138 | A | | 2/2000 | Hahn et al. | 524/590 |
| 6,110,264 | A | * | 8/2000 | Banning et al. | 106/31.29 |
| 6,329,453 | B1 | * | 12/2001 | Meinhardt et al. | 524/210 |
| 6,620,228 | B1 | * | 9/2003 | King et al. | 106/31.43 |
| 6,730,150 | B1 | * | 5/2004 | Titterington et al. | 106/31.43 |
| 6,841,589 | B2 | * | 1/2005 | Schmidt et al. | 523/160 |
| 6,896,937 | B2 | | 5/2005 | Woudenberg | |
| 6,906,118 | B2 | | 6/2005 | Goodbrand et al. | |
| 7,322,688 | B2 | | 1/2008 | Woudenberg | |
| 7,323,595 | B2 | * | 1/2008 | Banning et al. | 564/163 |
| 7,559,639 | B2 | | 7/2009 | Belelie et al. | |
| 2010/0129754 | A1 | * | 5/2010 | Cheetham et al. | 430/286.1 |
| 2011/0148979 | A1 | * | 6/2011 | Breton et al. | 347/20 |
| 2011/0152397 | A1 | * | 6/2011 | Breton et al. | 522/42 |
| 2011/0196058 | A1 | * | 8/2011 | Breton et al. | 522/79 |

* cited by examiner

*Primary Examiner* — Susan W Berman

(74) *Attorney, Agent, or Firm* — Oliff & Berridge, PLC

(57) ABSTRACT

A curable solid ink composition including a curable component, a non-curable component including an ethoxylated octylphenol derivative, a photoinitiator, and a colorant. The curable solid ink composition has a viscosity in the range of less than 10 cPs at 90° C., a shrinkage value of less than 3%, and a superior curing rate compared to existing curable solid ink compositions. The ethoxylated octylphenol derivatives may be prepared by reacting an ethoxylated octylphenol, a linear alcohol, and diisocyanates or polyisocyanates.

19 Claims, 3 Drawing Sheets

CURABLE SOLID INK COMPOSITIONS

TECHNICAL FIELD

The present disclosure is generally directed to a curable solid ink composition containing ethoxylated octylphenol derivatives and a method for producing the same that exhibits superior curing rate, shrinkage upon cooling, hardness, and scratch resistance over conventional solid, phase change inks and curable solid inks.

BACKGROUND

A printing ink is generally formulated according to strict performance requirements demanded by the intended market application and desired properties. Whether formulated for office printing or for production printing, a particular ink is expected to produce images that are robust and durable under stress conditions.

In a typical design of a piezoelectric ink-jet printing device, the image is applied by jetting appropriately colored inks during four to six rotations (incremental movements) of a substrate (an image receiving member or intermediate transfer member) with respect to the ink jetting head, i.e., there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Hot-melt inks typically used with ink-jet printers have a wax-based ink vehicle, such as a crystalline wax. Such solid ink-jet inks provide vivid color images. In conventional ink systems, crystalline-wax inks are jetted onto a transfer member, for example, an aluminum drum, at temperatures of approximately 120° C. to 140° C. The wax-based inks are heated to such high temperatures to decrease their viscosity for efficient and proper jetting onto the transfer member. The transfer member is at approximately 60° C., so that the wax will cool sufficiently to solidify or crystallize. As the transfer member rolls over the recording medium (such as paper), the image comprised of wax-based ink is pressed into the paper.

However, the use of crystalline waxes places limitations on the printing process used for conventional solid inks. For example, the printhead is kept at greater than 120° C. during the printing process which may lead to a number of problems. At these high temperatures, dyes that are molecularly dissolved in the ink vehicle are often susceptible to unwanted interactions leading to poor ink performance, for example: photo-oxidation from light (resulting in inferior lightfastness); thermal degradation (e.g., fluorescent dyes can lose fluorescence when the ink is heated to a temperature greater than 120° C.); dye diffusion from the ink into paper or other substrates (leading to poor image quality and showthrough); leaching of the dye into other solvents making contact with the image (leading to poor water-/solvent-fastness). Moreover, when the printhead is cooled and re-warmed, the resulting contraction and expansion of the ink requires a purge cycle to achieve optimum printhead performance. Enhanced mechanical robustness of the final printed image is also desired.

While conventional ink compositions, such as Color Qube™ 9200 Series solid ink, are used successfully, there is a need for a new type of phase-change ink capable of being printed via the piezo ink-jet printing processes. Furthermore, there is a need for ink compositions that can be processed at lower temperatures and with lower energy consumption having improved robustness, improved jetting reliability and latitude, and improved transfuse properties and can be fixed at low pressures. In addition, there is a need for phase-change ink compositions that exhibit desirably low viscosity values at jetting temperatures, generate images with improved look and feel characteristics, generate images with improved hardness and toughness characteristics, and are suitable for a number of commonly used substrates.

Furthermore, it is desirable to ensure that migration, evaporation or extraction of toxic or otherwise hazardous compounds used in such inks are reduced or eliminated. When such inks are used in certain applications (such as food packaging and direct to paper printing), it is desirable to reduce or eliminate the amount of unreacted monomers present, which may migrate or transfer from an image, in order to meet environmental, health, and safety requirements.

U.S. Pat. No. 6,896,937 discloses a radiation-curable hot melt ink composition comprising a colorant, a polymerizable monomer and a photoinitiating system comprising 0.5% to 1.5% by weight of an aromatic ketone photoinitiator, 2-10% by weight of an amine synergist, 3-8% by weight of a second photoinitiator different than the aromatic ketone photoinitiator and capable of undergoing alpha cleavage, and 0.5%-1.5% by weight of a photosensitizer. U.S. Pat. No. 6,896,937 also discloses liquid curable ink compositions and compositions with liquid diluents, these inks are not solids at room temperature. Furthermore, U.S. Pat. No. 7,322,688 discloses a method of inkjet printing curable inks but these inks are polymerized by a cationic photoinitiating system.

However, the conventional curable ink vehicles of the above references do not contain the ethoxylated octylphenol derivatives of the present disclosure and contain diluents. The cured hardness of the inks formulated by the above publications was also found to be less than 66 with a curing rate of about 100, less than half the curing rate of the inks of the present disclosure.

In U.S. application Ser. No. 12/642,538, filed Dec. 18, 2009, entitled "Curable Solid Overcoat Compositions"), which is hereby incorporated by reference herein in its entirety, describes low shrinkage radiation curable solid ink compositions containing commercial Licowax resins were disclosed as an alternative to conventional solid inks which showed improved performance over the inks disclosed in the above publications. These inks are acceptable for most applications, but there is a need to enhance their curing properties for increased printing speeds or reduced energy usage (green inks); for improved jettability and lower jetting temperature; and for reducing the percentage shrinkage seen upon cooling from jetting temperature to below crystallization temperature.

SUMMARY

The curable solid inks of the present disclosure resolves the above problems and deficiencies of conventional curable solid inks. According to one aspect of the present disclosure, a radiation curable solid ink composition is provided that includes: a curable component; a non-curable component comprising at least one ethoxylated octylphenol derivative; at least one photoinitiator; and a colorant; in which the components form a curable ink composition that is a solid at a first temperature (the first temperature is from about 20 to about 25° C.), and the components form a liquid composition at a second temperature (the second temperature is greater than about 40° C.).

EMBODIMENTS

Figure 1:
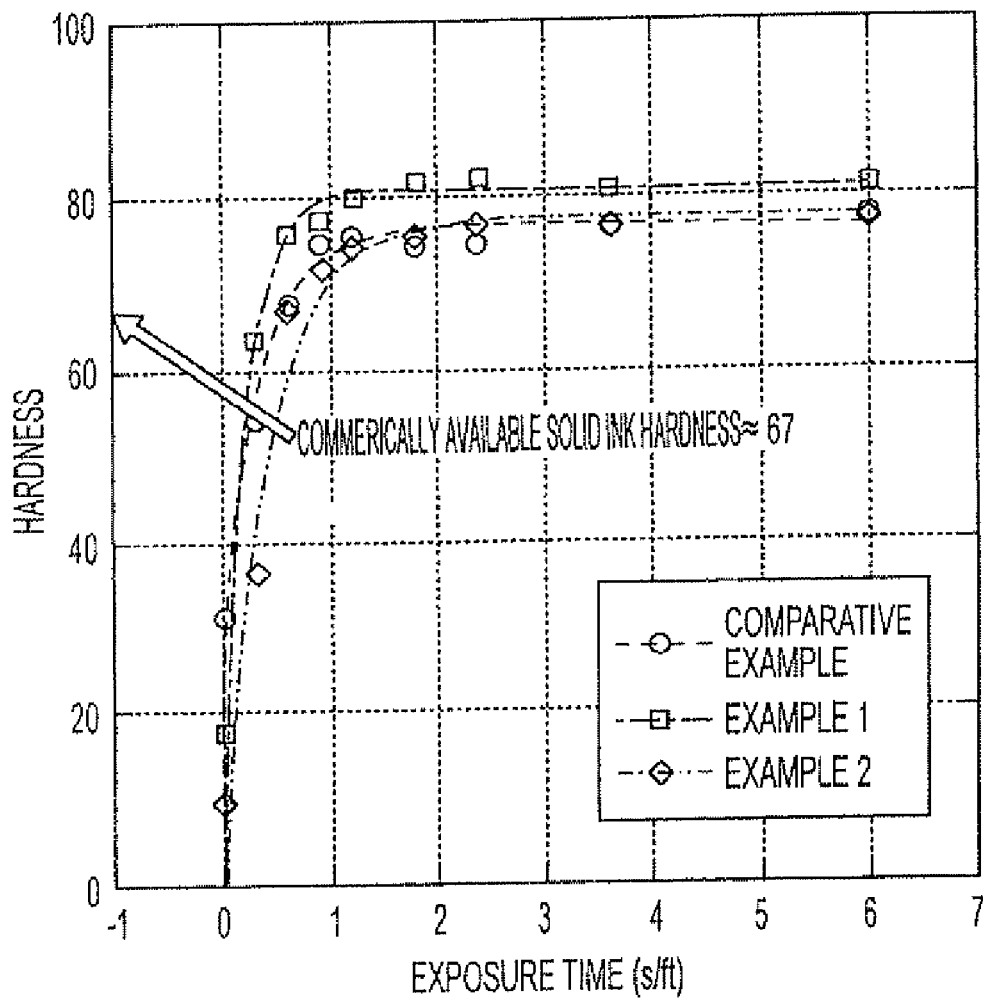
FIG. 1 shows a graph illustrating the hardness data of exemplary colorless curable solid inks of the present disclosure compared to a curable solid ink formulated with a Licowax-KFO resin (Comparative Example)

Described herein are ink formulations that enable printing at lower temperature (such as 70° C. to 100° C.) while achieving robustness performance that exceeds conventional solid wax-based inks. These low shrinkage curable solid inks are blends of waxes, ethoxylated octylphenol derivative resins, monomers, curable waxes and free-radical photoinitiators, all of them being solid with little or no odor below about 40° C. These components are also selected to enable the production of inks that are solids or pastes at a first temperature of from about 20° C. to about 25° C.; and wherein the components form a liquid composition at a second temperature of greater than about 40° C.

In embodiments, the components are solids or pastes at a first temperature of from about 20° C. to about 25° C., and form a liquid composition at a second temperature of about 40° C. to about 100° C., wherein at least about 99%, such as about 99.5%, of the components are in liquid faun and do not thermally decompose into other products when heated to the second temperature within the range of about 40° C. to about 100° C., such as about 70° C. to about 100° C. In embodiments, the components are solids or pastes at a first temperature of from about 20° C. to about 25° C., and the components form a liquid composition at a second temperature of about 70° C. to about 100° C., wherein at least 99.9%, such as about 99.99%, of the components are in liquid form do not thermally decompose into other products when heated to the second temperature within the range of about 70° C. to about 100° C., such as about 75° C. to about 95° C. Thus, the inks of the present disclosure may be jetted at temperatures in the range of about 70° C. to about 100° C., such as from about 75° C. to about 95° C. The robustness of these inks are independently controlled by photochemically curing them with high efficiency, efficiency being dependent on the chemistry of the formulation and the reactivity of the photoinitiating system, to form images with excellent smear resistance and with a hardness after cure greater than other solid inks, such as Color Qube™ 9200 Series solid ink, which exhibit a hardness of approximately 67. The term high efficiency curing process refers, for example, to a curing process where the photoinitiator triggers a nearly instantaneous curing reaction upon exposure to the UV light—producing a completely polymerized inks in seconds or less of exposure.

In an embodiment of the present disclosure, the curable solid ink includes curable components. The components disclosed herein may comprise any suitable curable monomer, oligomer, or prepolymer that is a solid at room temperature (about 20° C. to about 25° C.). Examples of suitable materials include radically curable monomer compounds, such as acrylate and methacrylate monomer compounds, which are suitable for use as phase change ink carriers. In embodiments, the at least one monomer, oligomer, or prepolymer is an acrylate monomer, a methacrylate monomer, a multifunctional acrylate monomer, a multifunctional methacrylate monomer, or a mixture or combination thereof.

Specific examples of relatively nonpolar solid acrylate and methacrylate monomers include, for example, lauryl acrylate, lauryl methacrylate, isodecylacrylate, isodecylmethacrylate, octadecylacrylate, behenyl acrylate, cyclohexane dimethanol diacrylate, and the like, as well as mixtures and combinations thereof.

Specific examples of nonpolar liquid acrylate and methacrylate monomers include, for example, isobornyl acrylate, isobornyl methacrylate, caprolactone acrylate, 2-phenoxyethyl acrylate, isooctylacrylate, isooctylmethacrylate, butyl acrylate, and the like, as well as mixtures and combinations thereof. In embodiments, the radiation curable solid ink composition herein further comprises at least one monomer, oligomer, or prepolymer that is a nonpolar liquid acrylate or methacrylate monomer selected from the group consisting of isobornyl acrylate, isobornyl methacrylate, caprolactone acrylate, 2-phenoxyethyl acrylate, isooctylacrylate, isooctylmethacrylate, butyl acrylate, or a mixture or combination thereof.

In addition, multifunctional acrylate and methacrylate monomers and oligomers may be included in the phase change ink carrier as reactive diluents and as materials that can increase the crosslink density of the cured image, thereby enhancing the toughness of the cured images. Examples of suitable multifunctional acrylate and methacrylate monomers and oligomers include (but are not limited to) pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl) isocyanurate triacrylate, propoxylated neopentyl glycol diacrylate (available from Sartomer Co. Inc. as SR 90038®), hexanediol diacrylate, tripropylene glycol diacrylate, dipropylene glycol diacrylate, amine modified polyether acrylates (available as PO 83 F®, LR 8869®, and/or LR 8889® (all available from BASF Corporation), trimethylolpropane triacrylate, glycerol propoxylate triacrylate, dipentaerythritol pentaacrylate, dipentaerythritol hexaacrylate, ethoxylated pentaerythritol tetraacrylate (available from Sartomer Co. Inc. as SR 494®), and the like, as well as mixtures and combinations thereof.

The monomer, oligomer, prepolymer, reactive diluent, or combination thereof, may be present in any suitable amount. In embodiments, the monomer, oligomer, prepolymer, reactive diluent, or combination thereof is present in an amount of from about 1 to about 80%, or from about 30 to about 70%, or from about 35 to about 60%, by weight based on the total weight of the CSI composition.

These curable components include monomers and curable waxes, such as a dimethanol diacrylate cyclohexane difunctional monomer having a melting point of about 78° C. (sold under the tradename CD-406, manufactured by Sartomer); an isocyanurate triacrylate trifunctional monomer having a melting point ranging from about 50° C. to about 55° C. (sold under the tradename SR-368, manufactured by Sartomer); an acrylic ester having a mixture of 18, 20, and 22 carbons having a melting point of about 55° C. (sold under the tradename CD587, manufactured by Sartomer); and an acrylate-modified or methacrylate-modified wax based on UNILIN 350 (which is a hydroxyl-terminated polyethylene wax, manufactured by Baker Petrolite) having a mixture of 22, 23, and 24 carbons with a melting point ranging from about 50° C. to about 60° C. Suitable curable components may also be found in U.S. application Ser. No. 12/642,538, filed Dec. 18, 2009.

For example, the curable wax herein may be any suitable curable wax that is curable by free radical polymerization. Examples of suitable curable waxes may include those that are functionalized with curable groups. The curable groups may include, but are not limited to, acrylate, methacrylate, alkene, vinyl, and allylic ether. In embodiments, the radiation curable solid ink composition contains at least one curable wax and the at least one curable wax contains an acrylate, methacrylate, alkene, vinyl, or allylic ether functional group. These waxes may be synthesized by the reaction of a wax equipped with a transformable functional group, such as carboxylic acid or hydroxyl.

Suitable examples of hydroxyl-terminated polyethylene waxes that may be functionalized with a curable group include, for example, mixtures of carbon chains with the structure $CH_3-(CH_2)_n-CH_2OH$, where there is a mixture of chain lengths, n, where the average chain length is in selected embodiments in the range of about 16 to about 50, and linear low molecular weight polyethylene, of similar average chain length. Suitable examples of such waxes include, for example, UNILIN® 350, UNILIN® 425, UNILIN® 550 and UNILIN® 700 with Mn approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. Specific embodiments of Guerbet alcohols include those containing 16 to 36 carbons, many of which are commercially available from Jarchem Industries Inc., Newark, N.J. In embodiments, PRIPOL® 2033 is selected, PRIPOL® 2033 being a C-36 dimer diol mixture including isomers of the formula

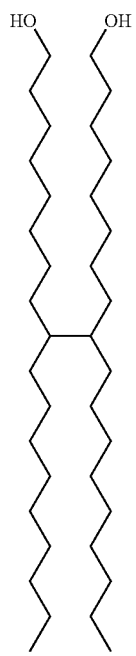

as well as other branched isomers which may include unsaturations and cyclic groups, available from Uniqema, New Castle, Del., Further information on C36 dimer diols is disclosed in, for example, "Dimer Acids," Kirk-Othmer Encyclopedia of Chemical Technology, Vol. 8, 4th Ed. (1992), pp, 223 to 237, the disclosure of which is totally incorporated herein by reference. These alcohols can be reacted with carboxylic acids equipped with UV curable moieties to form reactive esters. Examples of these acids include, but are not limited to, acrylic and methacrylic acids, available from Sigma-Aldrich Co. Specific curable monomers include acrylates of UNILIN® 350, UNILIN® 425, UNILIN® 550 and UNILIN® 700.

Suitable examples of carboxylic acid-terminated polyethylene waxes that may be functionalized with a curable group include, for example, mixtures of carbon chains with the structure $CH_3-(CH_2)_n-COOH$, where there is a mixture of chain lengths, n, where the average chain length is in selected embodiments in the range of about 16 to about 50, and linear low molecular weight polyethylene, of similar average chain length. Suitable examples of such waxes include, for example, UNICID® 350, UNICID® 425, UNICID® 550 and UNICID® 700 with Mn equal to approximately 390, 475, 565 and 720 g/mol, respectively. Other suitable waxes have a structure $CH_3-(CH_2)_n-COOH$, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Selected Guerbet acids include those containing 16 to 36 carbons, many of which are commercially available from Jarchem Industries Inc., Newark, N.J. PRIPOL® 1009 (C-36 dimer acid mixture including isomers of the formula

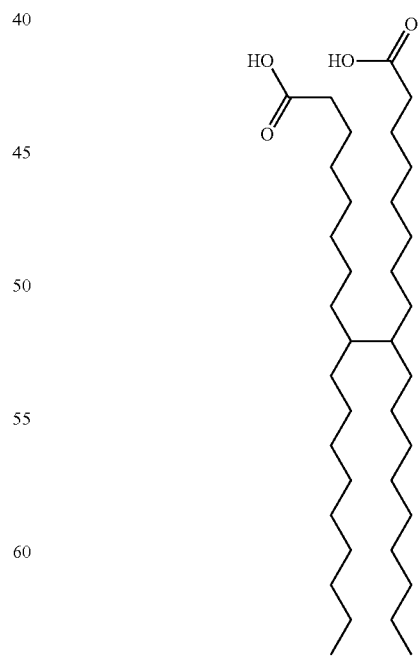

as well as other branched isomers which may include unsaturations and cyclic groups, available from Uniqema, New Castle, Del., may also be used. These carboxylic acids may be reacted with alcohols equipped with UV curable moieties to form reactive esters. Examples of these alcohols include, for example, 2-allyloxyethanol from Sigma-Aldrich Co.;

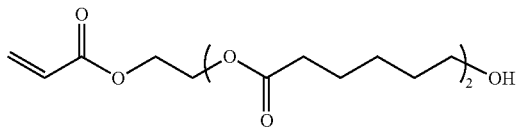

SR495B® from Sartomer Company, Inc.;
TONE® M-101 (R=H, $n_{avg}$=1), TONE® M-100 (R=H, $n_{avg}$=2) and TONE® M-201 (R=Me, $n_{avg}$=1) from The Dow Chemical Company; and

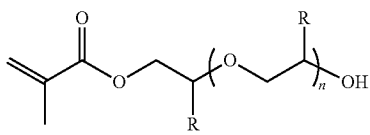

CD572® (R=H, n=10) and SR604® (R=Me, n=4) from Sartomer Company, Inc.

In embodiments, the curable wax is a curable acrylate wax having a melting point of from about 50 to about 60° C. In specific embodiments, the curable wax is Unilin® 350 acrylate. Synthesis of Unilin 350 acrylate curable wax is described in U.S. Pat. No. 7,559,639, the entire disclosure of which is totally incorporated herein by reference.

In embodiments, the curable solid ink composition further comprises a curable oligomer. Suitable curable oligomers include, for example, acrylated polyesters, acrylated polyethers, acrylated epoxies, urethane acrylates, and pentaerythritol tetraacrylate. Specific examples of suitable acrylated oligomers include, for example, acrylated polyester oligomers, such as CN2255®, CN2256® (Sartomer Co.), and the like, acrylated urethane oligomers, acrylated epoxy oligomers, such as CN2204®, CN110® (Sartomer Co.), and the like; and mixtures and combinations thereof.

In embodiments, the radiation curable solid ink composition comprises at least one monomer, oligomer, or prepolymer having a melting point of from about 45 to about 80° C.

The curable oligomer may be present in any suitable amount, such as from about 0.1 to about 15% or from about 0.5 to about 10%, or from about 1 to about 5% by weight based upon the total weight of the curable solid ink composition.

In an embodiment of the present disclosure, the disclosed curable solid ink also includes non-curable components, present in an amount ranging from about from 5% to about 50% of the ink, such as about 20% to about 40% of the ink, or about 25% to about 40% of the ink.

The non-curable components include non-curable waxes including ethoxylated octylphenol derivatives, which are soluble in the ink composition and/or have a melting point of about 5° C. to about 10° C. below jetting temperatures (which may range from about 70° C. to about 100° C.) so that the non-curable waxes homogenously combine with the other components of the ink composition. Furthermore, the molecular weight (MW) of ethoxylated octylphenol derivatives range from about 600 to about 5000 g/mole. The term "ethoxylated octylphenol derivatives" also refers, for example, to those shown in Scheme 1 below, and may be prepared using the exemplary methods below (as set forth in the Examples)

SCHEME 1
Method A

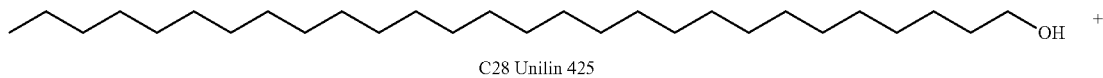

C28 Unilin 425

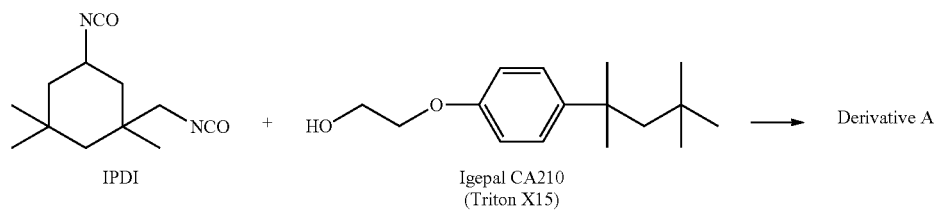

Method B

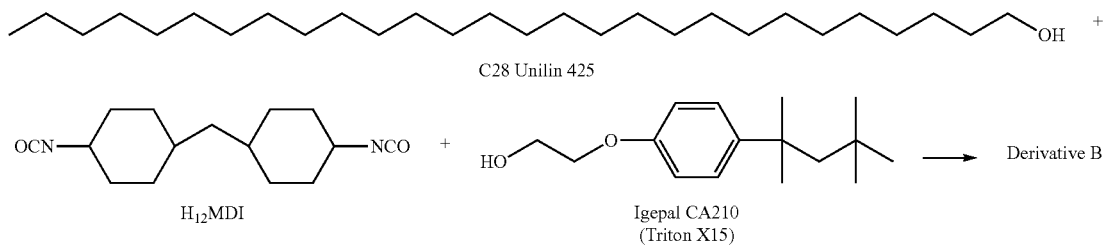

-continued

Method C

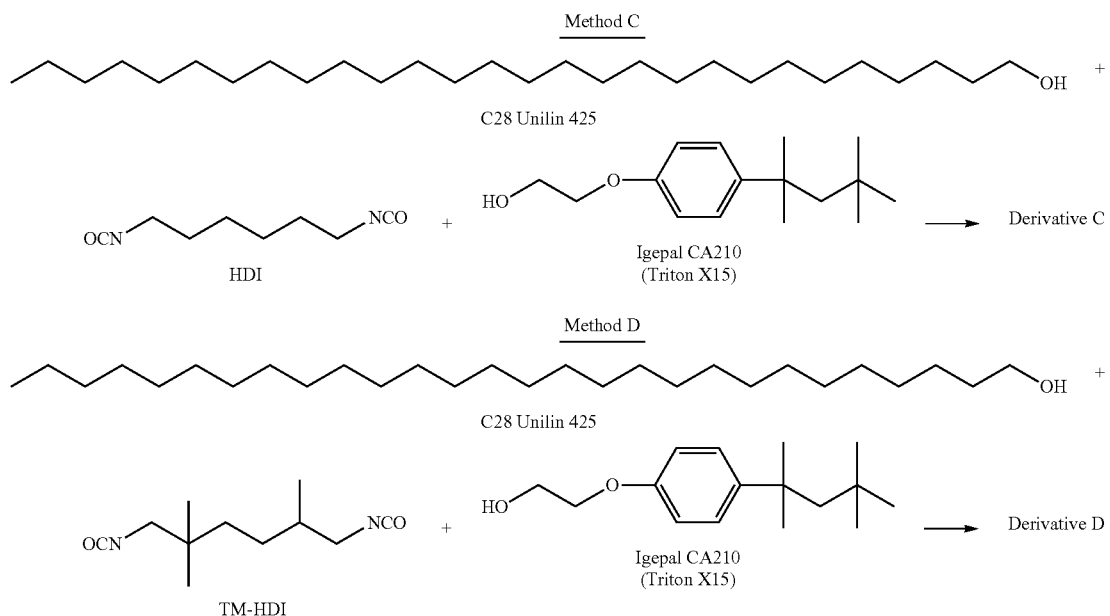

Method D

Derivative A:

Derivative D:

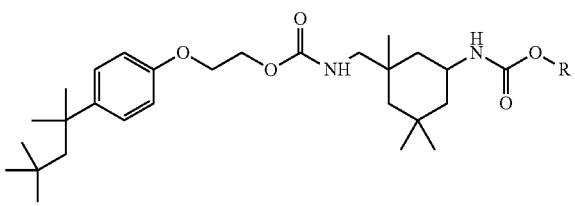

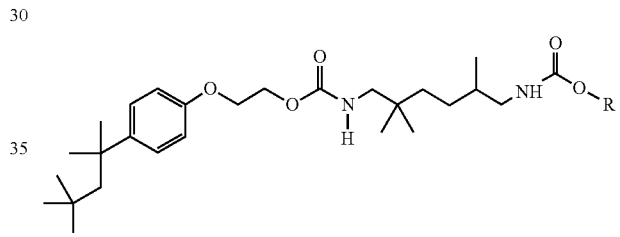

Derivative B:

In the above formulas for Derivatives A, B, C and D, R is a hydrocarbon chain in which the number carbons range from

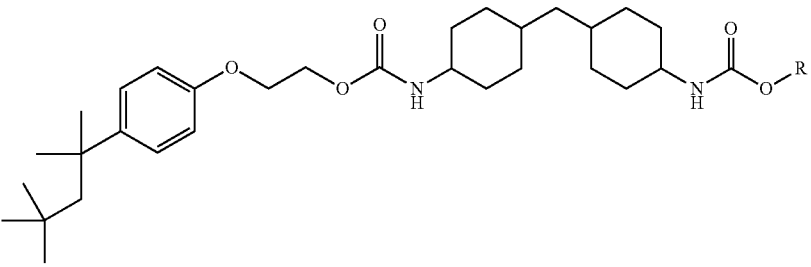

Derivative C:

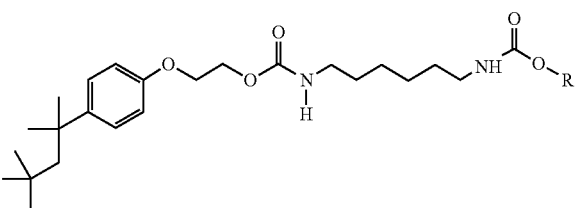

18 to 48, such as from 24 to 34 or from 28 to 30. In embodiments, in the above formulas for Derivatives A, B, C and D, R is $CH_3-(CH_2)_n-$ where n is an integer between 17 and 47, such as where n is an integer between 23 and 33, or where n is either 27 or 29. In embodiments, the ethoxylated octylphenol derivatives may be a mixture of ethoxylated octylphenol derivatives of one or more, such as two, or three, or four of the above formulas for Derivatives A, B, C or D (where R is $CH_3-(CH_2)_n-$) in which the Derivatives present in the mixture comprise a range of integer values of n. For example, the ethoxylated octylphenol derivative mixture may include as its main component (the term "main component" refers, for example, to the component present in the highest proportion)

a molecule of the formula for Derivatives A, B, C or D, where R is $CH_3—(CH_2)_n—$ and n is an integer between 17 and 47, such as wherein is an integer between 23 and 33, or where n is either 27 or 29. Furthermore, the breadth of the range of integer values for n (of the Derivatives of the above formulas where R is $CH_3—(CH_2)_n—$) making up the distribution of molecules present in the mixture may also vary, such that the mixture of Derivative molecules is made up by molecules having an integer value of n in the range from 17 ($CH_3—(CH_2)_{17}—$) to 47 ($CH_3—(CH_2)_{47}—$), such as in the range from 23 ($CH_3—(CH_2)_{23}—$) to 33 ($CH_3—(CH_2)_{33}—$) or in the range from 27 ($CH_3—(CH_2)_{27}—$) to 29 ($CH_3—(CH_2)_{29}—$).

Reactants for the ethoxylated octylphenol derivatives may be selected from the Triton and Igepal CA series based on octyl phenol ethoxylates, such as, for example, Igepal CA-210 (equivalent to Triton X-15), Igepal CA-420 (equivalent to Triton X-35), Igepal CA-510 (equivalent to Triton X-45) Igepal CA-620 (equivalent to Triton X-114), Igepal CA-630 (equivalent to Triton X-100), Igepal CA-720 (equivalent to Triton X-102, Igepal CA-887 (equivalent to Triton X-305) Igepal CA-890 (equivalent to Triton X-405), Igepal CA-897 (equivalent to Triton X705) as well as Igepal CO series (based on nonylphenol ethoxylation) such as Igepal CO210, CO520, CO630, CO720, CO890, and Igepal DM970 based on dinonylphenol ethoxylates.

The ethoxylated octylphenol derivatives may be prepared by mixing specific reactive components, for example, an ethoxylated octylphenol, a linear alcohol, and a diisocyanate and/or a polyisocyanate. These reactive components may include a linear alcohol having 28 or 30 carbons (sold under the tradename Unilin 425); ethoxylated octylphenols, such as IGEPAL CA-210, IGEPAL CA-420, IGEPAL CA-520, IGEPAL CA-620, IGEPAL CA-630, and IGEPAL CA-720 (ethoxylated octylphenols sold under the tradename IGEPAL; formally manufactured by Rhone-Poulenc Co. and currently manufactured by Rhodia; the Triton Series was formally manufactured by Union Carbide and currently manufactured by the Dow Chemical Company); diisocyanates and polyisocyanates, including aromatic, aliphatic, cycloaliphatic and/or (cyclo)aliphatic diisocyanates and/or polyisocyanates. Suitable aliphatic diisocyanates or polyisocyanates may have 3 to 16 carbon atoms or 4 to 12 carbon atoms, in the linear or branched alkyl portion, and suitable cycloaliphatic or (cyclo)aliphatic diisocyanates may possess 4 to 18 carbon atoms or 6 to 15 carbon atoms, in the cycloalkyl portion. The term "(cyclo)aliphatic diisocyanates" refers, for example, to NCO groups that are attached cyclically and aliphatically at the same time (such as isophorone diisocyanate); and cycloaliphatic diisocyanates include those which contain only NCO groups attached directly to the cycloaliphatic ring, such as $H_{12}MDI$.

Suitable diisocyanates and polyisocyanates include, for example, isophorone diisocyanate (IPDI); diisocyanatodicyclohexylmethane ($H_{12}MDI$); hexamethylene diisocyanate (HDI); 2,2,4-trimethylhexamethylene diisocyanate/2,4,4 trimethylhexamethylene diisocyanate (TM-HDI); 2-methylpentane diisocyanate (MPDI); norbornane diisocyanate (NBDI); phenylene 1,3- and 1,4-diisocyanate; naphthylene 1,5-diisocyanate; tolidine diisocyanate; tolylene 2,6-diisocyanate; tolylene 2,4-diisocyanate (2,4-TDI); diphenylmethane 2,4'-diisocyanate (2,4'-MDI); diphenylmethane 4,4'-diisocyanate; the mixtures of monomeric diphenylmethane diisocyanates (MDI) and oligomeric diphenylmethane diisocyanates (polymer MDI); xylylene diisocyanate; tetramethylxylylene diisocyanate (TMXDI); triisocyanatotoluene; cyclohexane diisocyanate; methylcyclohexane diisocyanate; ethylcyclohexane diisocyanate; propylcyclohexane diisocyanate; methyldiethylcyclohexane diisocyanate; propane diisocyanate; butane diisocyanate; pentane diisocyanate; hexane diisocyanate; heptane diisocyanate; octane diisocyanate, nonane diisocyanate; nonane triisocyanate, such as 4-isocyanatomethyloctane 1,8-diisocyanate (TIN); decane diisocyanate and triisocyanate; undecane diisocyanate and triisocyanate; dodecane diisocyanates and triisocyanates; 4-methylcyclohexane 1,3-diisocyanate; 2-butyl-2-ethylpentamethylene diisocyanate; 3(4)-isocyanatomethyl-1-methylcyclohexyl isocyanate; 2-isocyanatopropylcyclohexyl isocyanate; methylenebis-(cyclohexyl) 2,4'-diisocyanate; 1,4-diisocyanato-4-methylpentane; and mixtures thereof.

In embodiments, the curable solid ink composition comprises a photoinitiator that initiates polymerization of curable components of the ink, including the curable monomer and the curable wax. The initiator is preferably solid at room temperature and soluble in the composition at jetting temperature. In specific embodiments, the initiator is an ultraviolet radiation activated photoinitiator.

In embodiments, the initiator is a radical initiator. Examples of suitable radical photoinitiators include, but are not limited to, ketones such as benzyl ketones, monomeric hydroxyl ketones, polymeric hydroxyl ketones, and α-amino ketones; acyl phosphine oxides, metallocenes, benzophenones and benzophenone derivatives, such as 2,4,6-trimethylbenzophenone and 4-methylbenzophenone; and thioxanthenones, such as 2-isopropyl-9H-thioxanthen-9-one. A specific ketone is 1-[4-(2-hydroxyethoxy)-phenyl]-2-hydroxy-2-methyl-1-propane-1-one. In a specific embodiment, the ink contains an et-amino ketone, 1-[4-(2-hydroxyethoxy)-phenyl]-2-hydroxy-2-methyl-1-propane-1-one.

In another embodiment, the curable solid ink composition comprises a three-component photoinitiator system with no synergist. U.S. Pat. No. 6,896,937 discloses a radiation-curable hot melt ink composition comprising a colorant, a polymerizable monomer and a photoinitiating system comprising 0.5 to 1.5% by weight of an aromatic ketone photoinitiator, 2 to 10% by weight of an amine synergist, 3 to 8% by weight of a second photoinitiator that is different than the aromatic ketone photoinitiator and capable of undergoing alpha cleavage, and 0.5 to 1.5% by weight of a photosensitizer. U.S. Pat. No. 6,896,937 also discloses liquid curable ink compositions and compositions with liquid diluents, which inks are not solids at room temperature. U.S. Pat. No. 7,322,688 discloses a method of inkjet printing curable inks which inks are polymerized by a cationic photoinitiating system. In embodiments, the curable solid ink composition comprises a photoinitiator that initiates polymerization of curable components of the ink, including the curable monomer and the curable wax. In an embodiment, the initiator is solid at room temperature and soluble in the composition at jetting temperature. In specific embodiments, the initiator is an ultraviolet radiation activated photoinitiator.

In embodiments, the initiator is a radical initiator. Examples of suitable radical photoinitiators include, for example, ketones such as benzyl ketones, monomeric hydroxyl ketones, polymeric hydroxyl ketones, and α-amino ketones; acyl phosphine oxides, metallocenes, benzophenones and benzophenone derivatives, such as 2,4,6-trimethylbenzophenone and 4-methylbenzophenone; and thioxanthenones, such as 2-isopropyl-9H-thioxanthen-9-one. A exemplary ketone is 1-[4-(2-hydroxyethoxy)-phenyl]-2-hydroxy-2-methyl-1-propane-1-one. In an embodiment, the ink contains an α-amino ketone, 1-[4-(2-hydroxyethoxy)-phenyl]-2-hydroxy-2-methyl-1-propane-1-one and 2-isopropyl-9H-thioxanthen-9-one. In a specific embodiment, the photoinitiator comprises 2-isopropylthioxanthone and 2-isopropylthioxanthone, 2-methyl-1[4-(methylthio)phenyl]-2-morpholinopropan-1-one, or a mixture or combination thereof.

In specific embodiments of the present disclosure, the disclosed curable solid ink also includes photoinitiators, such as α-hydroxyketone photoinitators (including α-hydroxyketone photoinitators sold under the tradename IRGACURE 184, IRGACURE 500, DAROCUR 1173, and IRGACURE 2959, which are manufactured by Ciba Special Chemicals), α-aminoketone photoinitators (including α-aminoketone photoinitators IRGACURE 369, IRGACURE 379, IRGACURE 907, and IRGACURE 1300, which are manufactured by Ciba Special Chemicals), and bisacyl phospine photoinitiators (including bisacyl phospine photoinitiators sold under the tradename IRGACURE 819, IRGACURE 819DW, and IRGACURE 2022, which are manufactured by Ciba Special Chemicals). Other suitable photoinitiators include monoacylphosphine oxide and bisacylphosphine oxide, such as 2,4,6-trimethylbenzoybiphenylphosphine oxide (manufactured by BASF under the tradename Lucirin TPO); ethyl-2,4,6-trimethylbenzoylphenyl phosphinate (manufactured by BASF under the tradename Lucirin TPO-L); mono- and bisacylphosphine photoinitiators (such IRGACURE 1700, IRGACURE 1800, IRGACURE 1850, and DAROCUR 4265, manufactured by Ciba Specialty Chemicals), and benzyldimethyl-ketal photoinitiators (such as IRGACURE 651, manufactured by Ciba Specialty Chemicals).

In another embodiment of the present disclosure, the disclosed curable solid ink also includes a colorant. Any desired or effective colorant may be employed, including pigment, dye, mixtures of pigment and dye, mixtures of pigments, mixtures of dyes, and the like, provided that the colorant may be dissolved or dispersed in the ink vehicle. Examples of suitable dyes include, for example, Blue Olefin Dye 24316, available from the Eastman Chemical Company; Usharect Blue 86 (Direct Blue 86), available from Ushanti Colour; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF, available from Clariant; Carta Blue 2GL, available from Clariant; solvent dyes, including spirit soluble dyes such as Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF); Neozapon Black X51 [C.I. Solvent Black, C.I. 12195] (BASF); Sudan Blue 670 [C.I. 61554] (BASF); Sudan Yellow 146 [C.I. 12700] (BASF); Sudan Red 462 [C.I. 260501] (BASF); and the like, as well as mixtures thereof.

Pigments are also suitable colorants for the solid (or phase change) inks. Examples of suitable pigments include PALIOGEN Violet 5100 (BASF); PALIOGEN Violet 5890 (BASF); HELIOGEN Green L8730 (BASF); LITHOL Scarlet D3700 (BASF); SUNFAST® Blue 15:4 (Sun Chemical); Hostaperm Blue B2G-D (Clariant); Permanent Red P-F7RK; Hostaperm Violet BL (Clariant); LITHOL Scarlet 4440 (BASF); Ban Red C (Dominion Color Company); ORACET Pink RF (Ciba); PALIOGEN Red 3871 K (BASF); SUNFAST® Blue 15:3 (Sun Chemical); PALIOGEN Red 3340 (BASF); SUNFAST® Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC® C Orange 16 (Sun Chemical); HELIOGEN Blue K6902, K6910 (BASF); SUNFAST® Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1 355, D1 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT); PALIOGEN Black L0084 (BASF); Pigment Black K801 (BASF); and carbon blacks such as REGAL 330™ (Cabot), Carbon Black 5250, Carbon Black 5750 (Columbia Chemical), and the like, as well as mixtures thereof.

The colorant may be present in the solid (or phase change) ink in any desired or effective amount to obtain the desired color or hue, for example at least about 0.1 percent by weight of the ink, or at least about 0.2 percent by weight of the ink, or no more than about 25 percent by weight of the ink, or less than 15 percent by weight of the ink or no more than about 8 percent by weight of the ink.

Solid (or phase change) inks for color printing typically comprise a solid (or phase change) ink carrier composition which is combined with a solid (or phase change) ink compatible colorant. A series of colored solid (or phase change) inks may be formed by combining ink carrier compositions with compatible subtractive primary colorants. The subtractive primary colored solid (or phase change) inks may include, for example, four component dyes, namely, cyan, magenta, yellow and black. These subtractive primary colored inks may be formed by using a single dye or a mixture of dyes. For example, magenta may be obtained by using a mixture of Solvent Red Dyes or a composite black may be obtained by mixing several dyes. U.S. Pat. Nos. 4,889,560, 4,889,761, and 5,372,852, the disclosures of each of which are totally incorporated herein by reference, teach that the subtractive primary colorants employed may comprise dyes from the classes of Color Index (C.I.) Solvent Dyes, Disperse Dyes, modified Acid and Direct Dyes, and Basic Dyes. The colorants may also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in solid (or phase change) ink compositions.

The ink of embodiments may further include conventional additives to take advantage of the known functionality associated with such conventional additives. Such additives may include, for example, biocides, defoamers, slip and leveling agents, plasticizers, pigment dispersants, viscosity modifiers, antioxidants, absorbers, etc.

Optional antioxidants in the ink may protect the images from oxidation and also may protect the ink components from oxidation while existing as a heated melt in the ink reservoir. Examples of suitable antioxidants include (1) N,N'-hexamethylene bis(3,5-di-tert-butyl-4-hydroxy hydrocinnamamide) (IRGANOX 1098, available from Ciba-Geigy Corporation), (2) 2,2-bis(4-(2-(3,5-di-tert-butyl-4-hydroxyhydrocinnamoyloxy))ethoxyphenyl) propane (TOPANOL-205, available from ICI America Corporation), (3) tris(4-tert-butyl-3-hydroxy-2,6-dimethyl benzyl) isocyanurate (CYANOX 1790, 41,322-4, LTDP, Aldrich D12, 840-6), (4) 2,2'-ethylidene bis(4,6-di-tert-butylphenyl) fluoro phosphonite (ETHANOX-398, available from Ethyl Corporation), (5) tetrakis(2,4-di-tert-butylphenyl)-4,4'-biphenyl diphosphonite (ALDRICH 46, 852-5; hardness value 90), (6) pentaerythritol tetrastearate (TCI America #PO739), (7) tributylammonium hypophosphite (Aldrich 42,009-3), (8) 2,6-di-tert-butyl-4-methoxyphenol (Aldrich 25,106-2), (9) 2,4-di-tert-butyl-6-(4-methoxybenzyl)phenol (Aldrich 23,008-1), (10) 4-bromo-2,6-dimethylphenol (Aldrich 34,951-8), (11) 4-bromo-3,5-didimethylphenol (Aldrich B6, 420-2), (12) 4-bromo-2-nitrophenol (Aldrich 30,987-7), (13) 4-(diethyl aminomethyl)-2,5-dimethylphenol (Aldrich 14,668-4), (14) 3-dimethylaminophenol (Aldrich D14, 400-2), (15) 2-amino-4-tert-amylphenol (Aldrich 41,258-9), (16) 2,6-bis(hydroxymethyl)-p-cresol (Aldrich 22,752-8), (17) 2,2'-methylenediphenol (Aldrich B4,680-8), (18) 5-(diethylamino)-2-nitrosophenol (Aldrich 26,951-4), (19) 2,6-dichloro-4-fluorophenol (Aldrich 28,435-1), (20) 2,6-dibromo fluoro phenol (Aldrich 26,003-7), (21) α-trifluoro-o-creso-1 (Aldrich 21,979-7), (22) 2-bromo-4-fluorophenol (Aldrich 30,246-5), (23) 4-fluorophenol (Aldrich F1,320-7), (24) 4-chlorophenyl-2-chloro-1,1,2-tri-fluoroethyl sulfone (Aldrich 13,823-1), (25) 3,4-difluoro phenylacetic acid (Aldrich 29,043-2), (26) 3-fluorophenylacetic acid (Aldrich 24,804-5), (27) 3,5-difluoro phenylacetic acid (Aldrich 29,044-0), (28) 2-fluorophenylacetic acid (Aldrich 20,894-9), (29) 2,5-bis(trifluoromethyl)benzoic acid (Aldrich 32,527-9), (30) ethyl-2-(4-(4-(trifluoromethyl)phenoxy)phenoxy) propionate (Aldrich 25,074-0), (31) tetrakis (2,4-di-tert-butyl phenyl)-4,4'-biphenyl diphosphonite (Aldrich 46,852-5), (32) 4-tert-amyl phenol (Aldrich 15,384-2), (33) 3-(2H-benzotriazol-2-yl)-4-hydroxy phenethylalcohol (Aldrich 43,071-4), NAUGARD 76, NAUGARD 445, NAUGARD 512, AND NAUGARD 524 (manufactured by Uniroyal Chemical Company), and the like, as well as mixtures thereof. The antioxidant, when present, may be present in the ink in any desired or effective amount, such as from about 0.25 percent to about 10 percent by weight of the ink or from about 1 percent to about 5 percent by weight of the ink.

The ink can also optionally contain a UV absorber. The optional UV absorbers primarily protect the generated images from UV degradation. Specific examples of suitable UV absorbers include (1) 2-bromo-2',4-dimethoxyacetophenone (Aldrich 19,948-6), (2) 2-bromo-2',5'-dimethoxyacetophenone (Aldrich 10,458-2), (3) 2-bromo-3'-nitroacetophenone (Aldrich 34,421-4), (4) 2-bromo-4'-nitroacetophenone (Aldrich 24,561-5), (5) 3',5'-diacetoxyacetophenone (Aldrich 11,738-2), (6) 2-phenylsulfonyl acetophenone (Aldrich 34,150-3), (7) 3'-aminoacetophenone (Aldrich 13, 935-1), (8) 4'-aminoacetophenone (Aldrich A3,800-2), (9) 1H-benzotriazole-1-acetonitrile (Aldrich 46,752-9), (10) 2-(2H-benzotriazol-2-yl)-4,6-di-tort-pentylphenol (Aldrich 42,274-6), (11) 1,1-(1,2-ethane-diyl)bis(3,3,5,5-tetramethylpiperazinone) (commercially available from Goodrich Chemicals), (12) 2,2, 4-trimethyl-1,2-hydroquinoline (commercially available from Mobay Chemical), (13) 2-(4-benzoyl-3-hydroxy phenoxy)ethylacrylate, (14) 2-dodecyl-N-(1,2,2,6,6-pentamethyl-4-piperidinyl) succinimide (commercially available from Aldrich Chemical Co., Milwaukee, Wis.), (15) 2,2,6,6-tetramethyl-4-piperidinyl/β-tetramethyl-3,9-(2,4,8,10-tetraoxo spiro(5,5)-undecane) diethyl-1,2,3,4-butane tetracarboxylate (commercially available from Fairmount), (16) N-(p-ethoxycarbonylphenyl)-N'-ethyl-N'-phenylformadine (commercially available from Givaudan), (17) 6-ethoxy-1,2-dihydro-2,2,4-trimethylquinoline (commercially available from Monsanto Chemicals), (18) 2,4,6-tris-(N-1,4-dimethylpentyl-4-phenylenediamino)-1,3,5-triazine (commercially available from Uniroyal), (19) 2-dodecyl-N-(2,2,6,6-tetrame-thyl-4-piperidinyl) succinimide (commercially available from Aldrich Chemical Co.), (20) N-(1-acetyl-2,2,6,6-tetramethyl-4-piperidinyl)-2-dodecyl succinimide (commercially available from Aldrich Chemical Co.), (21) (1,2,2,6,6-pentamethyl-4-piperidinyl/β-tetramethyl-3,9-(2,4,8,10-tetra oxo-spiro-(5,5)undecane)diethyl)-1,2,3,4-butane tetracarboxylate (commercially available from Fairmount), (22) (2,2,6,6-tetramethyl-4-piperidinyl)-1,2,3,4-butane tetracarboxylate (commercially available from Fairmount), (23) nickel dibutyl dithio carbamate (commercially available as UV-Chek AM-105 from Ferro), (24) 2-amino-2',5-dichlorobenzophenone (Aldrich 10,515-5), (25) 2'-amino-4',5'-dimethoxyacetophenone (Aldrich 32,922-3), (26) 2-benzyl-2-(dimethylamino)-4'-morpholino butyrophenone (Aldrich 40,564-7), (27) 4'-benzyloxy-2'-hydroxy-3'-methylacetophenone (Aldrich 29,884-0), (28) 4,4'-bis(diethylamino) benzophenone (Aldrich 16,032-6), (29) 5-chloro-2-hydroxy benzophenone (Aldrich C4,470-2), (30) 4'-piperazinoacetophenone (Aldrich 13,646-8), (31) 4'-piperidinoacetophenone (Aldrich 11,972-5), (32) 2-amino-5-chlorobenzophenone (Aldrich A4,556-4), (33) 3,6-bis(2-methyl-2-morpholinopropionyl)-9-octylcarbazole (Aldrich 46,073-7), and the like, as well as mixtures thereof. When present, the optional UV absorber may be present in the ink in any desired or effective amount, such as from about 1 percent to about 10 percent by weight of the ink or from about 3 percent to about 5 percent by weight of the ink.

The ink may also optionally contain a viscosity modifier. Examples of suitable viscosity modifiers include aliphatic ketones, such as stearone, and the like. When present, the optional viscosity modifier is present in the ink in any desired or effective amount, in one embodiment of at least about 0.1 percent by weight of the ink, in another embodiment of at least about 1 percent by weight of the ink, and in yet another embodiment of at least about 10 percent by weight of the ink, in another embodiment of no more than about 30 percent by weight of the ink, and in yet another embodiment of no more than about 15 percent by weight of the ink.

Other optional additives may include tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAXAWA KE-311 Resin, a triglyceride of hydrogenated abietic (rosin) acid (commercially available from Arakawa Chemical Industries, Ltd.), synthetic polyterpene resins such as NEVTAC® 2300, NEVIACO 100, and NEVRAC® 80 (commercially available from Neville Chemical Company), WINGTACK® 86, a modified synthetic polyterpene resin (commercially available from Goodyear), and the like, The tackifier may be present in an amount of at least about 0.1 percent by weight of the ink, in another embodiment of at least about 5 percent by weight of the ink, and in yet another embodiment of at least about 10 percent by weight of the ink, in yet another embodiment of no more than about 50 percent by weight of the ink, although the amount can be outside of these range. Adhesives, such as VERSAMID® 757, 759, or 744 (commercially available from Henkel), may be present in an amount in one embodiment of at least 10 about 0.1 percent by weight of the ink, in another embodiment of at least about 1 percent by weight of the ink, and in yet another embodiment of at least about 5 percent by weight of the ink, in another embodiment of no more than about 50 percent by weight of the ink, and in yet another embodiment of no more than about 10 percent by weight of the ink, although the amount can be outside of these ranges.

The ink may include an optional plasticizer, such as UNIPLEX® 250 (commercially 20 available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Mon25 santo), KP-140®, a tributoxyethyl phosphate (commercially available from FMC Corporation), MORFLEX® 150, a dicyclohexyl phthalate (commercially available from Marflex Chemical Company Inc.), trioctyl trimellitate (commercially available from Eastman Kodak Co.), and the like.

The plasticizer may be present in an amount of at least about 0.1 percent by weight of the ink, such as at least about 1 percent by weight of the ink, such as at least about 2 percent by weight of the ink, but no more than about 15 percent by weight of the ink.

Printed images may be generated with the ink described herein by incorporating the ink into an inkjet device, for example a thermal inkjet device, an acoustic inkjet device or a piezoelectric inkjet device, and concurrently causing droplets of the molten ink to be ejected in a pattern onto a substrate such as paper or transparency material, which can be recognized as an image. The ink is typically included in the at least one reservoir connected by any suitable feeding device to the ejecting channels and orifices of the inkjet head for ejecting the ink. In the jetting procedure, the inkjet head may be heated, by any suitable method, to the jetting temperature of the inks. The reservoir(s) containing the phase change ink may also include heating elements to heat the ink. The phase change inks are thus transformed from the solid state to a molten state for jetting. "At least one" or "one or more," as used to describe components of the inkjet device, such as the ejecting channels, orifices, etc., refers to from 1 to about 2 million, such as from about 1000 to about 1.5 million or about 10,000 to about 1 million of any such component found in the inkjet device. "At least one" or "one or more" as used to describe other components of the inkjet device such as the inkjet head, reservoir, feeder, etc., refers to from 1 to about 15, such as from 1 to about 8 or from 1 to about 4 of any such component found in the inkjet device.

The ink can be jetted onto a suitable substrate to form an image. Any suitable substrate or recording sheet may be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, glossy coated papers such as XEROX® Digital Color Gloss, Sappi Warren Papers LUSTROGLOSS®, and the like, paper, transparency materials, fabrics, textile products, plastics, polymeric films, inorganic substrates such as metals, ceramics, and wood, and the like.

The composition may contain any combination of elements, as long as it meets physical properties encompassed by this disclosure. Components that may be used to form the composition are disclosed in U.S. Pat. No. 6,906,118 and is incorporated herein by reference in its entirety.

The ink compositions may also optionally contain other materials, which may depend upon the type of printer in which the ink is used. For example, the carrier composition is typically designed for use in either a direct printing mode or an indirect or offset printing transfer system.

The ink compositions of the present disclosure may be prepared by any desired or suitable method. In the case of solid ink compositions, the ink ingredients may simply be added together in an appropriate vessel, heated and mixed together with stirring to provide a homogeneous ink composition, and then cooled in a mold to provide an ink stick ready to be loaded in a compatible printer cartridge.

The subject matter disclosed herein will now be further illustrated by way of the following examples. All parts and percentages are by weight unless otherwise indicated.

EXAMPLES

Methods for preparing "ethoxylated octylphenol derivatives" for curable solid ink compositions are also disclosed in U.S. application Ser. No. 12/703,817, entitled "Process For Preparing Stable Pigmented Curable Solid Inks" concurrently filed herewith, the entire disclosure of which is totally incorporated herein by reference.

To a 250 mL flask equipped with a stir magnet was charged a pre-melted mixture of 70 g IGEPAL CA210 (MW=261) and 80.0 g Unilin 425 (OH #95,3, MW=589). The flask was placed in a 140° C. oil bath with thermometer and heated and stirred. After about 5 minutes, 30 g IPDI (MW=222) was added, followed by three drops of Fascat 4202 catalyst. An exotherm was observed. After about 1.5 hour, an IR spectrum was obtained on the reaction product and no isocyanate peak (about 2230 $cm^{-1}$) was observed. The contents were poured into aluminum tins and allowed to cool and solidify.

Method B for Preparation of Ethoxylated Octylphenol Derivative B ("Derivative B")

To a 250 mL flask equipped with a stir magnet was charged a pre-melted mixture of 29.9 g IGEPAL CA210 (OH#214.92, MW=261) and 67.9 g Unilin 425 (OH #95.3, MW=589). The flask was placed in a 140° C. oil bath with thermometer and heated/stirred. After about 5 minutes, 30 g dicyclohexylmethane-4,4' diisocyanate ($H_{12}$MDI, MW=262) was added, followed by three drops of Fascat 4202 catalyst. An exotherm was observed. After about 1.5 hour, an IR spectrum was obtained on the reaction product and no isocyanate peak (about 2230 $cm^{-1}$) was observed. The contents were poured into aluminum tins and allowed to cool and solidify, Method C for Preparation of Ethoxylated Octylphenol Derivative C ("Derivative C")

To a 250 mL flask equipped with a stir magnet was charged a pre-melted mixture of 46.6 g IGEPAL CA210 (OH#214.92, MW=261) and 105.7 g Unilin 425 (MW=589). The flask was placed in a 140° C. oil bath with thermometer and heated/stirred. After about 5 minutes, 30 g hexamethylene diisocyanate (HDI, MW=168) was added, followed by three drops of Fascat 4202 catalyst. An exotherm was observed. After about 1.5 hour, an IR spectrum was obtained on the reaction product and no isocyanate peak (about 2230 $cm^{-1}$) was observed. The contents were poured into aluminum tins and allowed to cool and solidify.

Method D for Preparation of Ethoxylated Octylphenol Derivative D ("Derivative D")

To a 250 mL flask equipped with a stir magnet was charged a pre-melted mixture of 37.3 g IGEPAL CA210 (OH#214.92, MW=261) and 84.6 g Unilin 425 (MW=589). The flask was placed in a 140° C. oil bath with thermometer and heated/stirred. After about 5 minutes, 30 g trimethyl hexamethylene diisocyanate (TMHDI, MW=210) was added, followed by three drops of Fascat 4202 catalyst. An exotherm was observed. After about 1.5 hour, an IR spectrum was performed on the reaction product and no isocyanate peak (about 2230 cm$^{-1}$) was observed. The contents were poured into aluminum tins and allowed to cool and solidify.

Colorless curable solid inks were formulated, as shown in Table 1 (labeled "Example 1" and "Example 2") with a curable solid ink formulated with the Licowax-KFO, an ester wax available from Clariant and having a drop melting point of about 89° ("Comparative Example").

TABLE 1

Ink Formulations

| Components | Comparative Example | Example 1 Weight % | Example 2 |
|---|---|---|---|
| Monomers | | | |
| CD406 | 20.81 | 20.81 | 20.81 |
| SR368 | 10.38 | 10.38 | 10.38 |
| CD587 | 29.31 | 29.31 | 29.31 |
| Curable Waxes | | | |
| Unilin 350 Acrylate | 8.50 | 8.50 | 8.50 |
| Non-curable Waxes | | | |
| Derivative A | 0.00 | 25.22 | 0.00 |
| Derivative D | 0.00 | 0.00 | 26.07 |
| Licowax KFO | 26.07 | 0.00 | 0.00 |
| Photoinitiators | | | |
| I819 | 1.60 | 1.55 | 1.60 |
| I184 | 2.30 | 2.23 | 2.30 |
| I379 | 0.00 | 1.00 | 0.00 |
| I907 | 1.03 | 1.00 | 1.03 |
| Total (approx.) | 100 | 100 | 100 |

The formulations shown in Table 1 were prepared using the following method: Into a 30 mL amber glass bottle, the components shown in Table 1 were added in the following order: CD406, SR368, CD587, Unilin 350 Acrylate, Licowax KFO or Derivative A, Irgacure 819, Irgacure 184, Irgacure 379 and Irgacure 907, to obtain a total of 10 g of ink. To this 10 g mixture was added a stir bar and the mixture was placed in a Variomag reaction block. The mixture was heated and stirred at approximately 90° C., and 300 RPM respectively for at least 20 minutes or until mixture appeared homogeneous. The temperature was increased to 100° C. for approximately 5 minutes. The mixture was brought back down to 90° C. and left to stir for 90 minutes.

As shown in Table 2, the pre-cure or initial hardness, curing rate (initial slope), hardness after cure (final hardness), viscosity and volume contraction data was measured for Examples 1 and 2 and the Comparative Example.

The pre- and post-cure hardness of the ink vehicle candidates were obtained with a PTC Durometer Model PS 6400-0-29001 utilizing a Model 476 Stand and with standard 1 Kg load. The hardness of a commercially available solid ink (Color Qube™ 9200 Series solid ink) was measured as 67, as shown in FIG. 1. The post-cured hardness of the curable solid ink of the present disclosure may range from about 40 to about 90, such as about 70 to about 90, or about 75 to about 85.

The curing rate was obtained by measuring the variation of hardness versus UV light exposure. A Fusion UV Systems Inc. Lighthammer equipped with a D-bulb was used to irradiate the vehicles and hardness was measured after specific exposure times. The hardness versus cure speed (s/ft) plot was used to obtain the initial curing rate for the ink vehicle.

TABLE 2

Properties of the Comparative Example and Examples 1 and 2 (Hardness versus exposure time)

| | Comparative Example | Example 1 | Example 2 |
|---|---|---|---|
| Pre-cured Hardness | 31.3 | 17.7 | 9.7 |
| Post-cured Hardness | 77.8 | 81.4 | 77.6 |
| Initial Slope | 122.3 | 264.8 | 207.9 |
| Viscosity at 90° C. (cP) | 8.90 | 9.24 | 8.66 |
| Volume Contraction (%) | 4.53 | 1.16 | 2.14 |

In Table 2, hardness and curing rate data were obtained from hardness versus exposure time plots using following expressions: $y = m_1 + m_2 \cdot (1 - \exp(-m_3 \cdot x))$, initial Hardness (pre-cured hardness)=$m_1$, initial slope (curing rate)=$m_2 \cdot m_3$; final hardness (post-cured hardness)=$m_1 + m_2$.

The curing rate of the inks of the present disclosure was found to be greater than 200, which is a more than 50% improvement over the Comparative Example and the post-cured hardness was as high or higher than the Comparative Example. The curing rate of curable solid ink may range from about 50 to about 400, about 100 to about 300, or about 150 to about 300.

Figure 2:
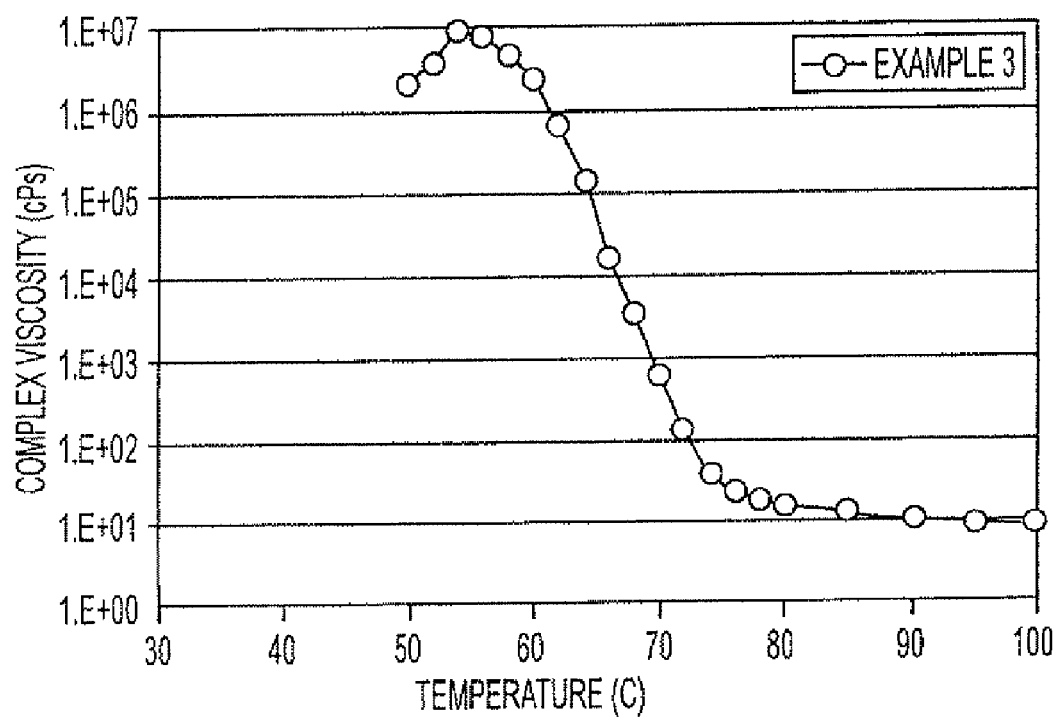
FIG. 2 shows a graph illustrating the viscosity data of an exemplary curable solid ink (Example 1) of the present disclosure obtained as a function of temperature.
Figure 3:
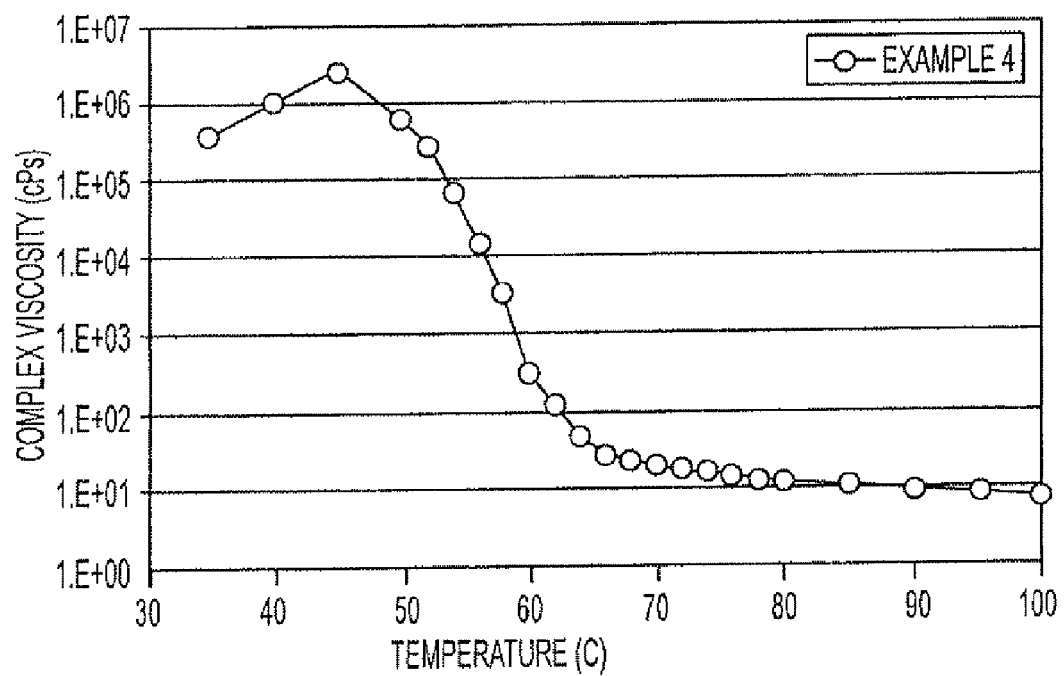
FIG. 3 shows a graph illustrating the viscosity data of an exemplary curable solid ink (Example 2) of the present disclosure obtained as a function of temperature.

In addition, because the curable solid inks in Examples 1 and 2 contain a low concentration of crystalline waxes, it was found that the shrinkage upon cooling from jetting temperature was reduced by about 50% compared to the Comparative Example. Shrinkage was measured by pouring about 6.7 mL of molten ink into a copper mold of 35 mL in diameter and 7 mL in height. The ink was left to cool for a minimum of 12 hours and the shrinkage determined from the diameter of the solidified ink and of the mold, making the assumption that the shrinkage in y- and x-direction (height) are the same. The shrinkage upon cooling from jetting temperature to room temperature (about 20° C. to about 25° C.) for the curable solid ink may range from about 0.1% to about 8%, such as about 0.5% to about 5%, or about 0.5% to about 3%. This enables vast improvement or even elimination of the current maintenance cycle associated with other curable solid inks. Furthermore, as shown in FIGS. 2 and 3, the viscosity of the curable solid ink may range from about 8 cps to about $10^7$ cps, about 10 to about $10^7$ cps in the temperature range of about 40° C. to about 100° C.

In order to evaluate print quality in relation to the amount of ethoxylated octylphenol derivative present in the curable solid ink composition, two additional samples (Experimental Examples 3 and 4) were formulated, which contained different amounts of Ethoxylated Octylphenol Derivative-IPDI-Unilin 425 resin (Derivative A). About 120 g of the formulation described for Example 1 (shown in Table 1) was prepared. In addition, Blue Olefin Dye 24316 was added to the formulation.

TABLE 3

Formulation of Curable Solid Inks in Example 3

| Components | Example 3 (g) | Weight % |
|---|---|---|
| Monomers | | |
| CD406 | 34.633 | 28.861 |
| SR368 | 2.693 | 2.244 |
| CD587 | 21.097 | 17.581 |
| Curable Waxes | | |
| Unilin ® 350 Acrylate-prepared as described in U.S. Pat. No. 7,559,639 | 9.996 | 8.330 |
| Non-Curable Waxes | | |
| Derivative A | 43.371 | 36.142 |
| Photoinitiators | | |
| I819 | 1.882 | 1.568 |
| I184 | 2.717 | 2.264 |
| I907 | 1.211 | 1.009 |
| Colorant | | |
| Blue Olefin Dye | 2.400 | 2.000 |
| Total | 120.00 | 100 |

TABLE 4

Formulation of Curable Solid Inks in Example 4

| Components | Experimental Example 4 (g) | Weight % |
|---|---|---|
| Monomers | | |
| CD406 | 24.720 | 20.600 |
| SR368 | 12.300 | 10.250 |
| CD587 | 34.812 | 29.010 |
| Curable Waxes | | |
| Unilin ® 350 Acrylate-prepared as described in U.S. Pat. No. 7,559,639 | 9.996 | 8.330 |
| Non-Curable Waxes | | |
| Derivative A | 29.964 | 24.970 |
| Photoinitiators | | |
| I819 | 1.884 | 1.570 |
| I184 | 2.712 | 2.260 |
| I907 | 1.212 | 1.010 |
| Colorant | | |
| Blue Olefin Dye | 2.400 | 2.000 |
| Total | 120.00 | 100 |

The inks of Experimental Examples 3 and 4 were printed (direct to paper mode) on a modified Phaser 8400 fixture using a PIJ printhead. The colored inks were printed at 95° C. on both plain and coated papers (4200®, Xerox Digital Color Xpressions® and Xerox Digital Color Elite Gloss® papers with the temperature of the drum (paper) being maintained at three different set points: 35° C., 40° C. and 45° C.

The direct to paper printed images were cured with a Fusion UV Systems Inc. Lighthammer equipped with a D-bulb at 32 ft/min. The cured images did not smear and have good scratch resistance, scratch resistance was significantly improved when substrate was set at higher temperatures that is from about 40 to about 45° C. Example 4 showed improved print quality over Example 3.

Accordingly, the curable solid inks of the present disclosure retain the advantages of handling, safety, and print quality associated with solid, phase change inks and curable solid inks formulated with commercial resins. However, the curable solid inks of the present disclosure provide superior performance, such as improved curing rate, low shrinkage upon cooling to room temperature (about 20° C. to about 25° C.), facilitation of direct to paper printing, superior hardness compared to solid inks, no smearing, and superior scratch resistance.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A radiation curable solid ink composition, comprising:
    a radiation curable component;
    a non-radiation curable component comprising at least one ethoxylated octylphenol derivative;
    at least one photoinitiator; and
    a colorant; wherein
        the composition has a shrinkage value of less than 3% upon cooling from 100° C. to room temperature,
        the components form a radiation curable ink composition that is a solid at a first temperature, and
        the components form a liquid composition at a second temperature, wherein
            the first temperature is from about 20 to about 25° C., and
            the second temperature is greater than about 40° C.

2. The radiation curable solid ink composition according to claim 1, wherein the radiation curable component comprises radiation curable waxes.

3. The radiation curable solid ink composition according to claim 1, wherein the non-radiation curable component comprises at least one non-radiation curable wax.

4. The radiation curable solid ink composition according to claim 1, wherein the ethoxylated octylphenol derivative is a compound with a formula selected from the consisting of

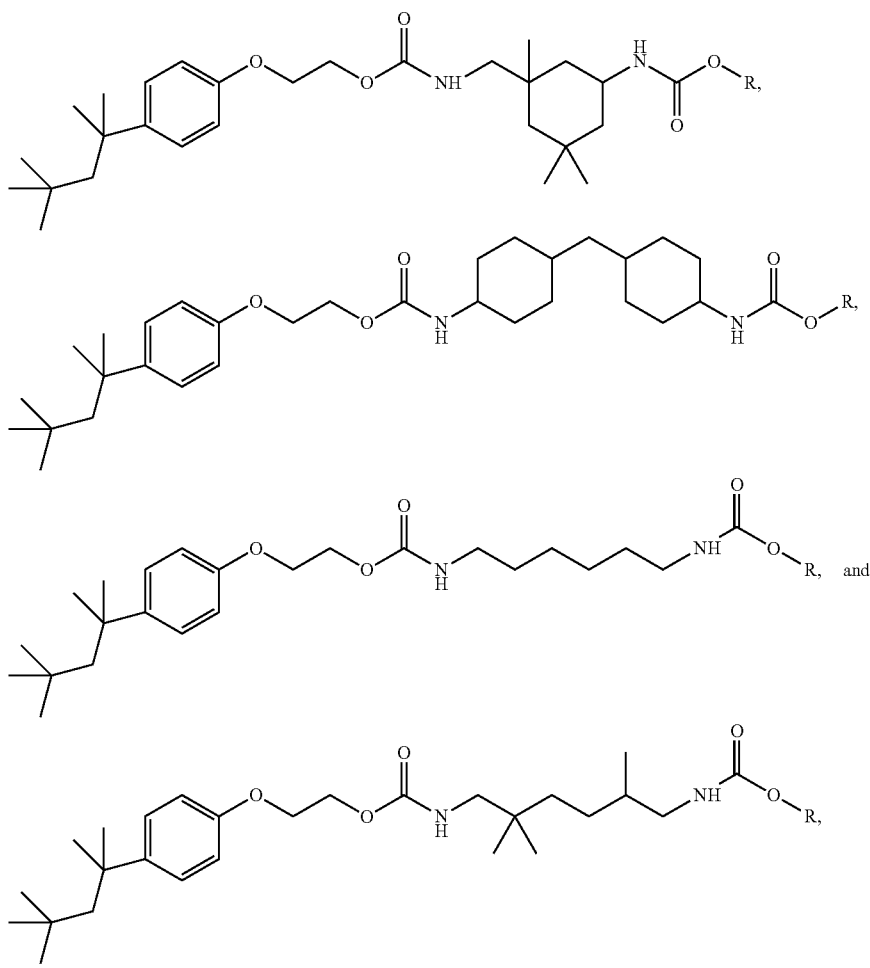

wherein

R in the above formulas is $CH_3$—$(CH_2)_n$— and n is an integer between 23 and 33.

5. The radiation curable solid ink composition according to claim 1, wherein the radiation curable component contains a functional group selected from the group consisting of acrylate, methacrylate, alkene, vinyl, allylic ether and mixtures thereof.

6. The radiation curable solid ink composition according to claim 1, wherein the photoinitiator is selected from a group consisting of, 1-hydroxy-cyclohexyl-phenyl-ketone, bis(2,4,6-trimethylbenzoyl)-phenylphosphineoxide, and 2-methyl-1 [4-methylthio]phenyl]-2-morpholinopropane-1 one, and mixtures thereof.

7. The radiation curable solid ink composition according to claim 1, wherein the non-radiation curable component is present in an amount ranging from about 5% to about 50% of the radiation curable ink composition by weight.

8. The radiation curable solid ink composition according to claim 1, wherein the non-radiation curable component is present in an amount ranging from about 20% to about 40% of the radiation curable ink composition by weight.

9. The radiation curable solid ink composition according to claim 1, wherein the colorant comprises non-visible colorants, infrared detectable colorants, or ultraviolet detectable colorants.

10. The radiation curable solid ink composition according to claim 1, wherein the composition has a curing rate ranging from about 100 ft/s to about 300 ft/s.

11. The radiation curable solid ink composition according to claim 1, wherein the composition has a post-cure hardness is from about 70 to about 95.

12. The radiation curable solid ink composition according to claim 1, wherein the composition has a viscosity of less than 12 cPs at 90° C.

13. The radiation curable solid ink composition according to claim 1, wherein the composition has a viscosity ranging from about 5 to about 12 at 90° C.

14. The radiation curable solid ink composition according to claim 1, wherein the components are solid at temperatures below 40° C.

15. The radiation curable solid ink composition according to claim 1, wherein the composition is jettable at temperatures from about 70° C. to 100° C.

16. The radiation curable solid ink composition according to claim 1, wherein the composition is jettable at temperatures from about 75° C. to 95° C.

17. A radiation curable solid ink composition, comprising:
a radiation curable component:
a non-radiation curable component comprising at least one ethoxylated octylphenol derivative with a formula selected from the group consisting of

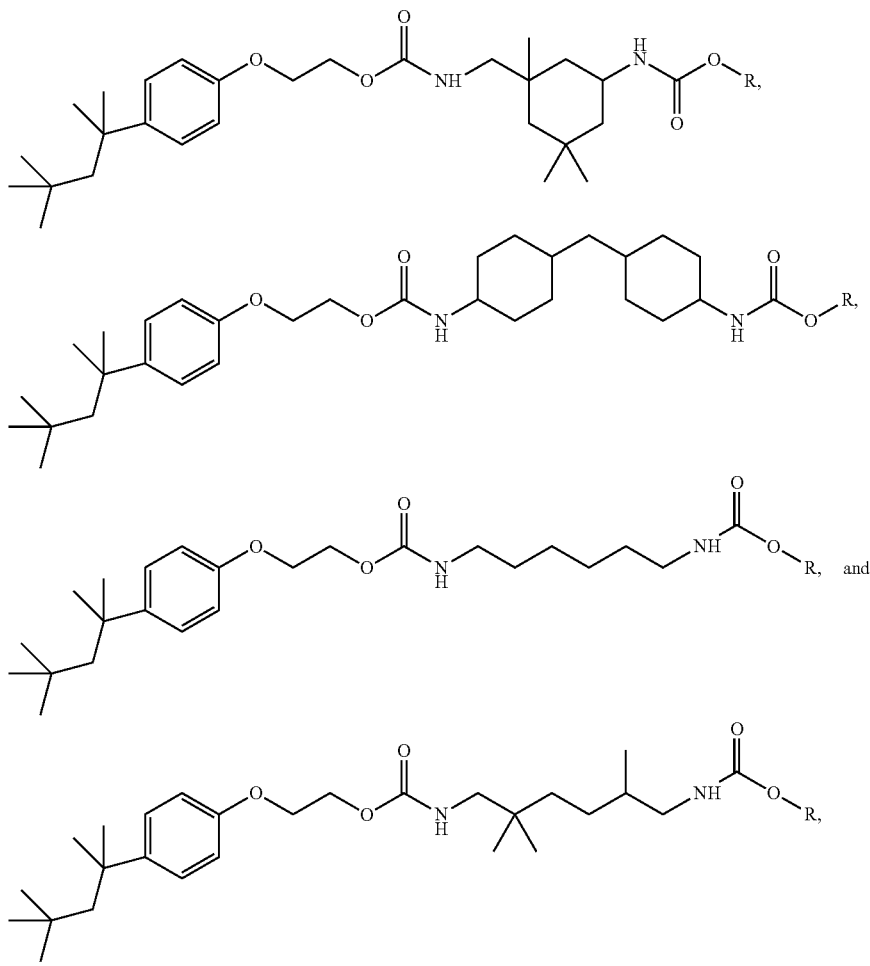

wherein
R in the above formulas is $CH_3-(CH_2)_n-$ and n is an integer between 17 and 47;
at least one photoinitiator; and
a colorant wherein
  the components form a radiation curable ink composition that is a solid at a first temperature, and
  the components form a liquid composition at a second temperature, wherein
    the first temperature is from about 20 to about 25° C., and
    the second temperature is greater than about 40° C.

18. The radiation curable solid ink composition according to claim 17, wherein the composition has a shrinkage value upon cooling from 100° C. to room temperature is from about 5% to about 0.1%.

19. A radiation curable solid ink composition, comprising:
a radiation curable component;
a non-radiation curable component comprising at least one ethoxylated octylphenol derivative;
at least one photoinitiator; and
a colorant; wherein
  the weight ratio of the radiation curable components to the non-radiation curable component is from about 0.95 to about 0.5,
  the components form a radiation curable ink composition that is a solid at a first temperature, and
  the components form a liquid composition at a second temperature, wherein
    the first temperature is from about 20 to about 25° C., and
    the second temperature is greater than about 40° C.

* * * * *